(12) United States Patent
Bailey et al.

(10) Patent No.: US 10,700,963 B2
(45) Date of Patent: *Jun. 30, 2020

(54) LOCATING SERVICE ENDPOINTS FROM A SERVICE REGISTRY

(71) Applicant: International Business Machines Corporation, Armonk, NY (US)

(72) Inventors: Thomas J. Bailey, Winchester (GB); Christopher D. Jenkins, Southampton (GB); Jonathan M. Roberts, Southampton (GB); Kieran P. Scott, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,141

(22) Filed: Aug. 25, 2016

(65) Prior Publication Data

US 2016/0366050 A1    Dec. 15, 2016

Related U.S. Application Data

(63) Continuation of application No. 13/179,738, filed on Jul. 11, 2011, now Pat. No. 9,483,312.

(30) Foreign Application Priority Data

Aug. 16, 2010    (EP) .................................... 10172929

(51) Int. Cl.
*H04L 12/721* (2013.01)
*H04L 29/08* (2006.01)
(Continued)

(52) U.S. Cl.
CPC ............ *H04L 45/34* (2013.01); *G06F 9/5055* (2013.01); *H04L 41/5003* (2013.01);
(Continued)

(58) Field of Classification Search
CPC ....... G06F 17/30902; G06F 2209/5015; H04L 41/5051; H04L 41/5096
See application file for complete search history.

(56) References Cited

U.S. PATENT DOCUMENTS 7,171,470 B2    1/2007    Doyle et al.
7,979,554 B2 *  7/2011    Ho ........................ G06F 9/544
                                                   707/607
(Continued)

FOREIGN PATENT DOCUMENTS

CN    1523844 A    8/2004
JP    2004030360 A   1/2004
(Continued)

OTHER PUBLICATIONS

Office Action for U.S. Appl. No. 15/219,985 dated Oct. 3, 2016, pp. 1-24.
(Continued)

*Primary Examiner* — Hitesh Patel
(74) *Attorney, Agent, or Firm* — Winstead PC

(57) ABSTRACT

A method, operable by a service registry in a service orientated architecture system, for providing a service within the system. A service request is received from a service requester in the system. The status of the service is checked as registered in the service registry. In response to the service not having a registered service endpoint or a property of the service falling below a defined threshold, a request is sent to service providers or subsequent service registries to provide a new service and according to the defined threshold. In response to a service provider providing the new service according to the defined standard, the service registry is updated with the new service and responding to the service requester that the service is available. The embodiments allow both direct interaction between the
(Continued)

requester and provider or indirect interaction via a service management layer.

18 Claims, 9 Drawing Sheets

(51) Int. Cl.
| | | |
|---|---|---|
| *G06F 9/50* | (2006.01) | |
| *H04L 12/24* | (2006.01) | |
| *H04L 12/751* | (2013.01) | |
| *H04L 29/06* | (2006.01) | |

(52) U.S. Cl.
CPC .............. *H04L 45/02* (2013.01); *H04L 67/10* (2013.01); *H04L 67/16* (2013.01); *H04L 67/42* (2013.01)

(56) References Cited

U.S. PATENT DOCUMENTS

| | | | |
|---|---|---|---|
| 2002/0178214 A1 | 11/2002 | Brittenham et al. | |
| 2004/0236633 A1* | 11/2004 | Knauerhase | G06Q 10/0631 |
| | | | 705/26.8 |
| 2005/0262504 A1* | 11/2005 | Esfahany | G06F 9/5077 |
| | | | 718/1 |
| 2008/0140759 A1 | 6/2008 | Conner et al. | |
| 2008/0270212 A1 | 10/2008 | Blight et al. | |
| 2009/0204612 A1 | 8/2009 | Keshavarz-Nia et al. | |
| 2009/0307298 A1* | 12/2009 | Jaiswal | G06F 9/5027 |
| | | | 709/202 |
| 2010/0100525 A1 | 4/2010 | Huang | |
| 2010/0130164 A1 | 5/2010 | Chowdhury et al. | |
| 2011/0173429 A1 | 7/2011 | Hollis | |
| 2012/0042040 A1 | 2/2012 | Bailey et al. | |

FOREIGN PATENT DOCUMENTS

| | | |
|---|---|---|
| JP | 2005510819 A | 4/2005 |
| JP | 2009531760 A | 9/2009 |
| TW | 201020918 A | 6/2010 |
| WO | 2008037788 A2 | 4/2008 |

OTHER PUBLICATIONS

International Search Report and Written Opinion for International Application No. PCT/EP2011/062743 dated Nov. 2, 2011, pp. 1-10.
IBM, "Method of Creating a Componentized Architecture for Unifying Resource Sharing Scenarios in Cloud Computing Environment," IPCOM000193146D, Feb. 11, 2010, pp. 1-13.
Dornemann et al., "On-Demand Resource Provisioning for BPEL Workflows Using Amazon's Elastic Compute Cloud," http://ds.informatik.uni-marburg.de/de/publications/pdf/CCGrid2009_BPEL-LoadBalancing_CameraReady.pdf, May 18, 2009, pp. 1-8.
Juhnke et al., "Fault-Tolerant BPEL Workflow Execution via Cloud-Aware Recovery Policies," http://ds.informatik.uni-marburg.de/de/publications/pdf/Euromicro2009_Fault-TolerantBPEL.pdf, Aug. 27, 2009, pp. 1-8.
Brandic et al., "Service Mediation and Negotiation Bootstrapping as First Achievements Towards Self-Adaptable Grid and Cloud Services," http://www.infosys.tuwien.ac.at/Staff/sd/papers/GMAC%20I.%20Brandic.pdf, Jun. 15, 2009, pp. 1-8.
Jeckle et al., "Active UDDI—an Extension to UDDI for Dynamic and Fault-Tolerant Service Invocation," http://citeseerx.ist.psu.edu/viewdoc/download?doi=10.1.1.11.5347&rep=rep1&type=pdf, Jun. 2002, pp. 1-10.
Spiess et al. "SOA-based Integration of the Internet of Things in Enterprise Services," Proceedings of the IEEE International Conference on Web Services (ICWS '09), Jul. 2009, pp. 968-975.
Office Action for U.S. Appl. No. 15/219,985 dated Jan. 25, 2017, pp. 1-38.
Office Action for U.S. Appl. No. 15/219,985 dated Nov. 5, 2019, pp. 1-18.
Examination Report from Intellectual Property Office of the United Kingdom for Application No. GB1301505.2 dated Aug. 1, 2017, pp. 1-6.

* cited by examiner

LOCATING SERVICE ENDPOINTS FROM A SERVICE REGISTRY

TECHNICAL FIELD

The present invention relates to service based deployment within a system based on a service oriented architecture (SOA), and more specifically, to locating service endpoints from a service registry.

BACKGROUND

Service oriented architecture (SOA) is a business-driven IT architectural approach that supports integrating business processes as linked, repeatable business tasks, or services as defined in service documents. A service document is a basic building block of SOA that defines how a service can be used, accessed and managed with other services. Service documents are used by analysts, architects, and developers during a development phase of the SOA life cycle to locate services to reuse and to evaluate the impact of changes to service configurations. Service documents are variously described as metadata, objects, descriptions, entities and artifacts that store information about a service including a service description and a service endpoint. A service endpoint is a unique computer addressable location for the service. Service documents are stored in a service registry within an SOA system. Information in each service document, including the service endpoints, is indexed in a process known as shredding. Indexing service documents to maintain a list of all services and service endpoints is a part of maintaining on demand services. An example of a service registry is IBM® WebSphere® Service Registry & Repository. The registry may highlight that there are several endpoints available to route the service request. When a request comes in, the registry can use its knowledge of the available service architecture topology and note that the service requested is either not available or is performing below the agreed service level agreement.

Installed services having a registered service endpoint can be invoked, whereas, services without a registered endpoint cannot be invoked. Services are installed in a service provider with a fixed or readily available service endpoint defined in the service document and indexed by a service registry. However, many service providers have fixed resources and have to prioritize high demand services over low demand services; therefore, not all services are available at the same time.

A low demand service may be uninstalled from a service provider and removed from the service provider's active services; any service endpoint associated with the service will be removed by the registry and the service archived so that it requires re-installation and setting up with a new service endpoint. It would be useful for a customer to request an uninstalled service and not experience any delay or difference in service. A low demand or uninstalled service many sometimes be referred to as legacy or an underused service.

The service provider may, instead of uninstalling, lower the processing priority of a low demand service or in some other way reduce processing bandwidth given to the low demand service. This could have the effect of reducing the quality of service experienced by the service requester to the point where the service was not what the service requester wanted. In some cases, the reduction in quality would be contrary to the terms of the service contract. It would be useful for a service requester to receive a desired quality of service and not experience a delay or difference in quality of service even if the requested service had had its processing priority lowered and needed to be reconfigured.

SUMMARY

In one embodiment of the present invention, a method, operable by a service registry in a service oriented environment for provisioning a service within the environment, comprises receiving a request for a service from a service requester in the environment. The method further comprises checking details of the requested service as registered in the service registry. Furthermore, the method comprises, in response to the service requested not being registered, sending the request to one or more service providers to provide a new service. In addition, the method comprises, in response to a service provider providing the new service, updating, by a processor, the service registry with the new service and responding to the service requester that the service is available.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
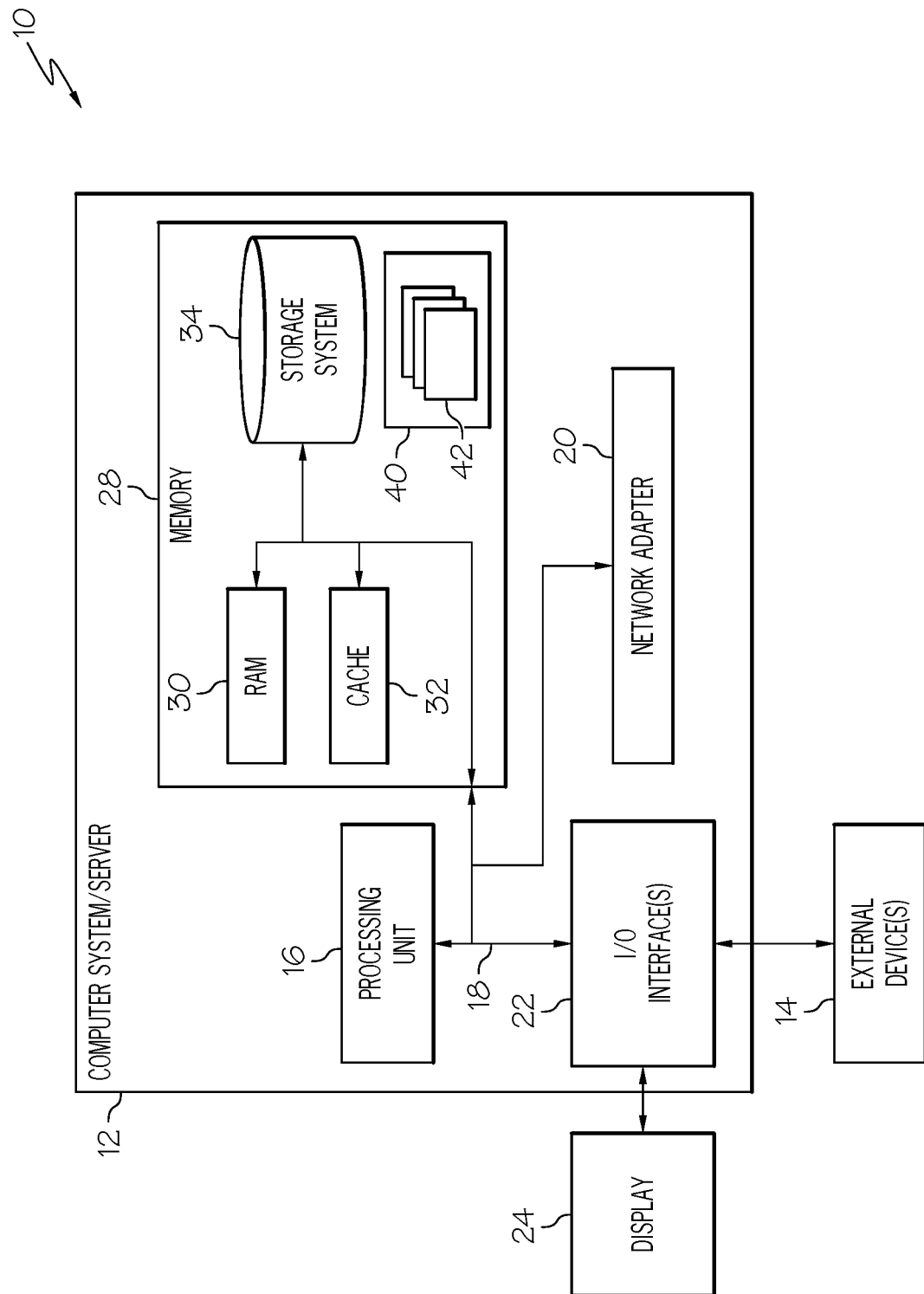
FIG. 1 illustrates a computer system node in accordance with an embodiment of the present invention.

The present invention comprises a method, system and computer program product, operable by a service registry in a service orientated architecture system, for providing a service within the system. A service request is received from a service requester in the system. The status of the service is checked as registered in the service registry. In response to the service not having a registered service endpoint or a property of the service falling below a defined threshold, a request is sent to service providers or subsequent service registries to provide a new service and according to the defined threshold. In response to a service provider providing the new service according to the defined standard, the service registry is updated with the new service and responding to the service requester that the service is available. The embodiments allow both direct interaction between the requester and provider or indirect interaction via a service management layer.

A service registry according to the embodiments of the present invention requests that a service (or additional instances of the service) be made available by a service provider and can be provided by cloud computing, for instance, by placing a virtual machine image containing the service onto available hardware. The new service endpoint is added to the registry and an enterprise service bus (ESB) is able to route to the new endpoint (in addition to any existing endpoints). The service remains deployed until some time-out or usage value is reached whereby the service is removed and the hardware is made available for other services. The service endpoint is removed from the registry if the registry discovers that the service endpoint has been removed from the service provider.

A registry is used by administrators who are provisioning the services directly or by using SOA administration applications. When services are started by an administrator, endpoint information is automatically placed in the registry for use by administrators or SOA administration applications. The endpoint information contains other types of endpoints as well as service endpoints and the present invention recognizes that when a service endpoint is missing, then it will be possible to acquire or provision a new service endpoint using the other types of endpoint information. Other types of endpoints are more abstract than service endpoints that are generally internet protocol addresses. The embodiments make available the other types of endpoint information to administrators and/or administration applications.

Embodiments of the present invention are realized in a service registry. The registry offers a layer of indirection whereby the invoking application does not necessarily know the location of the service endpoint. The indirection is used by service applications on an enterprise service bus (ESB) to allow management of direction of service requests to different endpoints dependent on service characteristics, such as quality of service or load balancing.

If there is no suitable service endpoint, or the performance characteristics are too low, then a request is made to provision a new instance of the service. An example of an existing endpoint that is not a service endpoint is a cloud tool that provisions virtual machine images when requested.

In the case of there being no service endpoint, then the registry can wait until a new service endpoint instance has been provided. The service registry returns this new service endpoint to the requesting application and the request is routed to the new service endpoint. In the case where there are already available service endpoints, the request can be routed to the existing service endpoints, but when the new service endpoint becomes available, future requests will have the new service endpoint available to them in addition to the existing service endpoints.

An advantage of the solution is that it allows more efficient management of low demand services from a service provider's available services as the solution can more efficiently uninstall and then reinstall a service. Deployed service instances can be monitored such that when the usage of the service drops below a set level, or a timeout is reached, then the service virtual machine image is removed from the cloud server.

The solution is particularly advantageous for a service provider that has limited numbers of servers and wants to offer many services to customers using cloud resources to expand services. Such a service provider might make available virtual endpoints that can host any one of a number of services. The service provider would simply provision a new service when a service request is received and then remove the service when the usage level has dropped. This would mean that the service provider will only have to pay for usage of the cloud when they are using it to host services, therefore, ensuring that their server costs are not fixed.

Referring to FIG. 1, there is shown a component diagram of a computer system node 10 according to an embodiment of the present invention. Computer system node 10 comprises a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types.

Computer system/server 12 may be embodied in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer system node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the present invention.

Program/utility 40, having a set (at least one) of program modules 42, may be stored in memory 28 by way of example, and not limiting, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
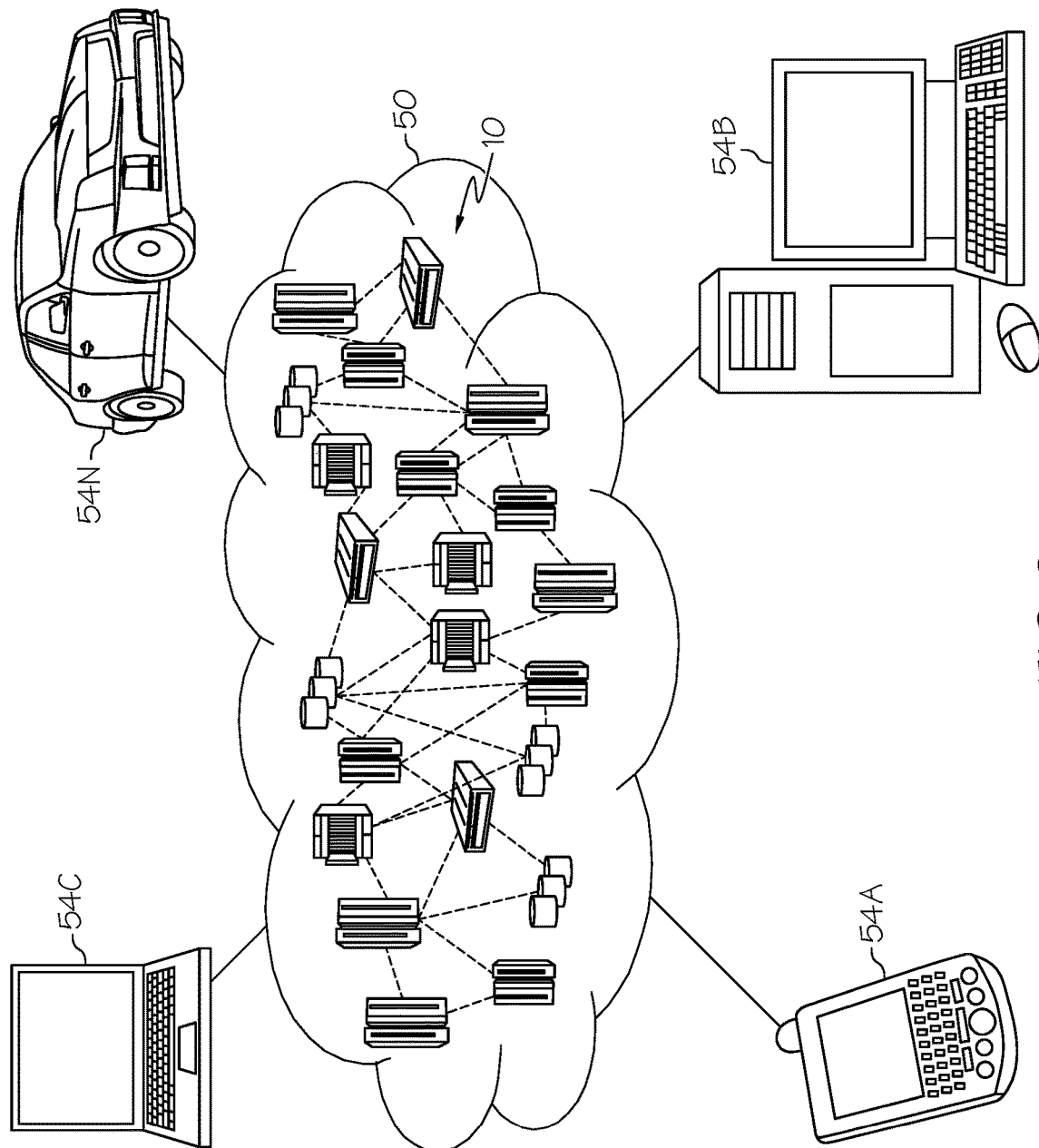
FIG. 2 illustrates a computer network environment comprising more than one computer system node in accordance with an embodiment of the present invention.

Referring now to FIG. 2, an illustrative cloud computing environment 50 of an embodiment of the present invention is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 2 are intended to be illustrative and that computing nodes 10 and cloud computing environment 50 can communicate with any type of computerized device over any type of network and/or network addressable connection (e.g., using a web browser).

Figure 3:
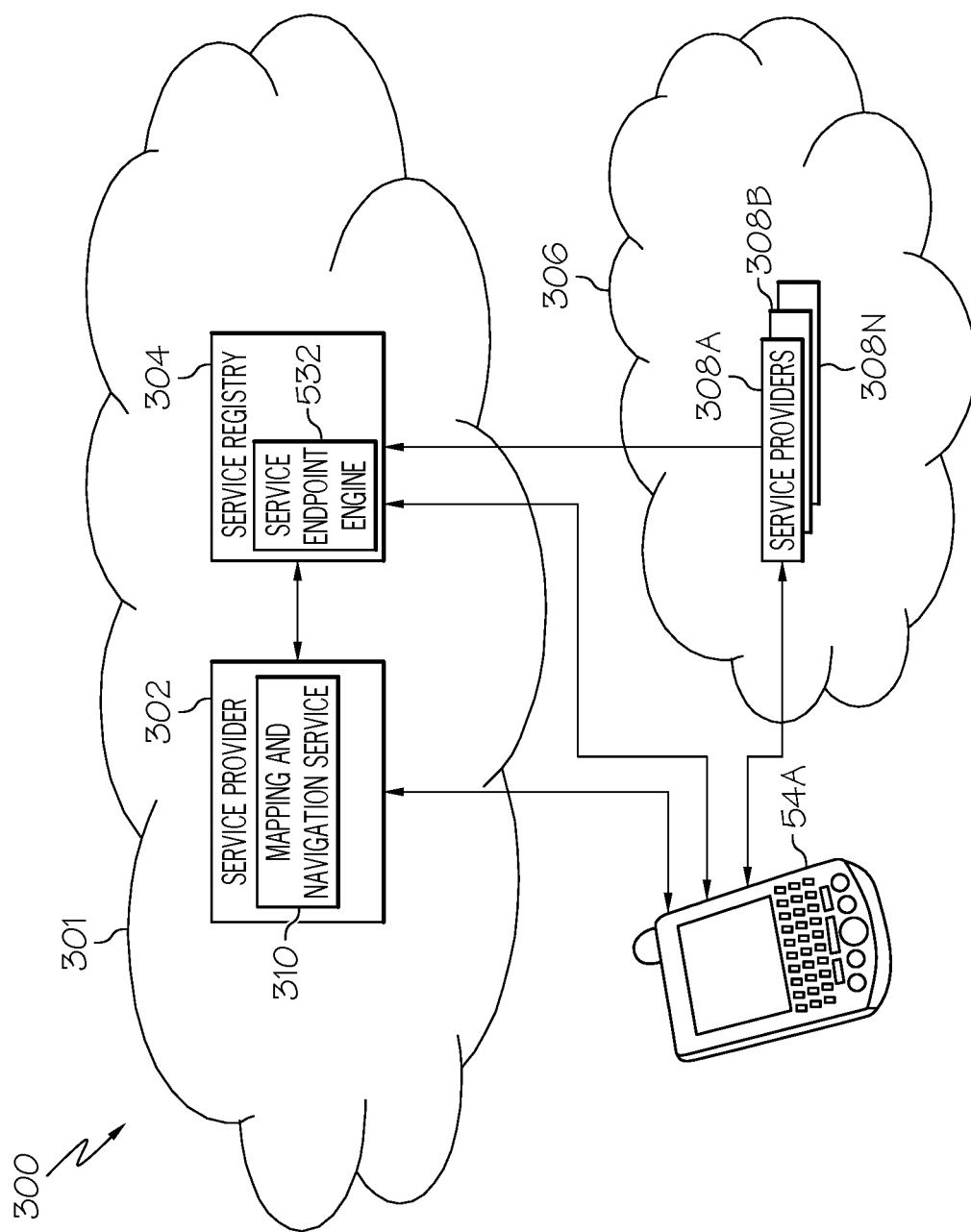
FIG. 3 illustrates a service oriented architecture system showing interactions between a service registry; a service requester and service providers according to an embodiment of the present invention.

Referring to FIG. 3, there is shown a component diagram of a SOA system 300 according to an embodiment of the present invention; the SOA system 300 comprises a user device 54A and at least two networks 301 and 306. First network 301 comprises at least one service provider 302 and a registry 304; typically, first network 301 is an enterprise network. Service provider 302 comprises an exemplary mapping and navigation service 310. A second network 306 comprises service providers 308A-308N. Registry 304 includes service endpoint engine 532.

A known interaction between a client device 54A and a service provider 302 or 308A-308N goes as follows. The client device 54A requests the use of a service from the registry 304, for example, the client device may request a map of its location. The registry 304 searches for and locates the requested service, for example, the mapping and navigation service 310. The registry 304 then selects one or more service endpoints associated with the located service. Each service endpoint comprises at least an Internet Protocol (IP) address and optionally a port number and service provider name to allow an IP service request to the service provider. The registry 304 then sends the service endpoint back to the requesting client device 54A and the client device 54A requests the mapping service from the service provider 302 or 308A-308N using the one or more of the supplied service endpoints. The registry 304 may supply a service endpoint that is within the same domain or enterprise (that is first network 301) as the registry 304 or it may supply one that is in another domain or enterprise. With the supplied service endpoint, the client can independently request a service from a service provider.

A problem occurs when the registry 304 cannot find a suitable service endpoint for a service request. All the embodiments provide a service endpoint engine 532 as part of the registry to seek out a suitable service endpoint outside of the registry when none is found in the registry. All the embodiments seek out the service endpoint from service providers and also other service registries (other service registries are not shown in FIGS. 3 and 4). If a service endpoint does not exist in the registry 304, then communication with other service entities allows the registry 304 to establish whether the service is temporarily offline or no longer provided by any service provider. A temporarily offline service is a service that is missing a service endpoint or not installed. If the service is temporarily offline, then the registry 304 seeks to re-establish, at the service provider, the service as available. Once a service provider 302 or 308A-308N makes available a service endpoint for a particular service, then the newly available service endpoint is registered, at the service register, for the first time or registered again by the registry 304 and then provided back to the service requester 54A. In one embodiment, the service requester 54A communicates directly with the service provider using the provided endpoint.

Figure 4:
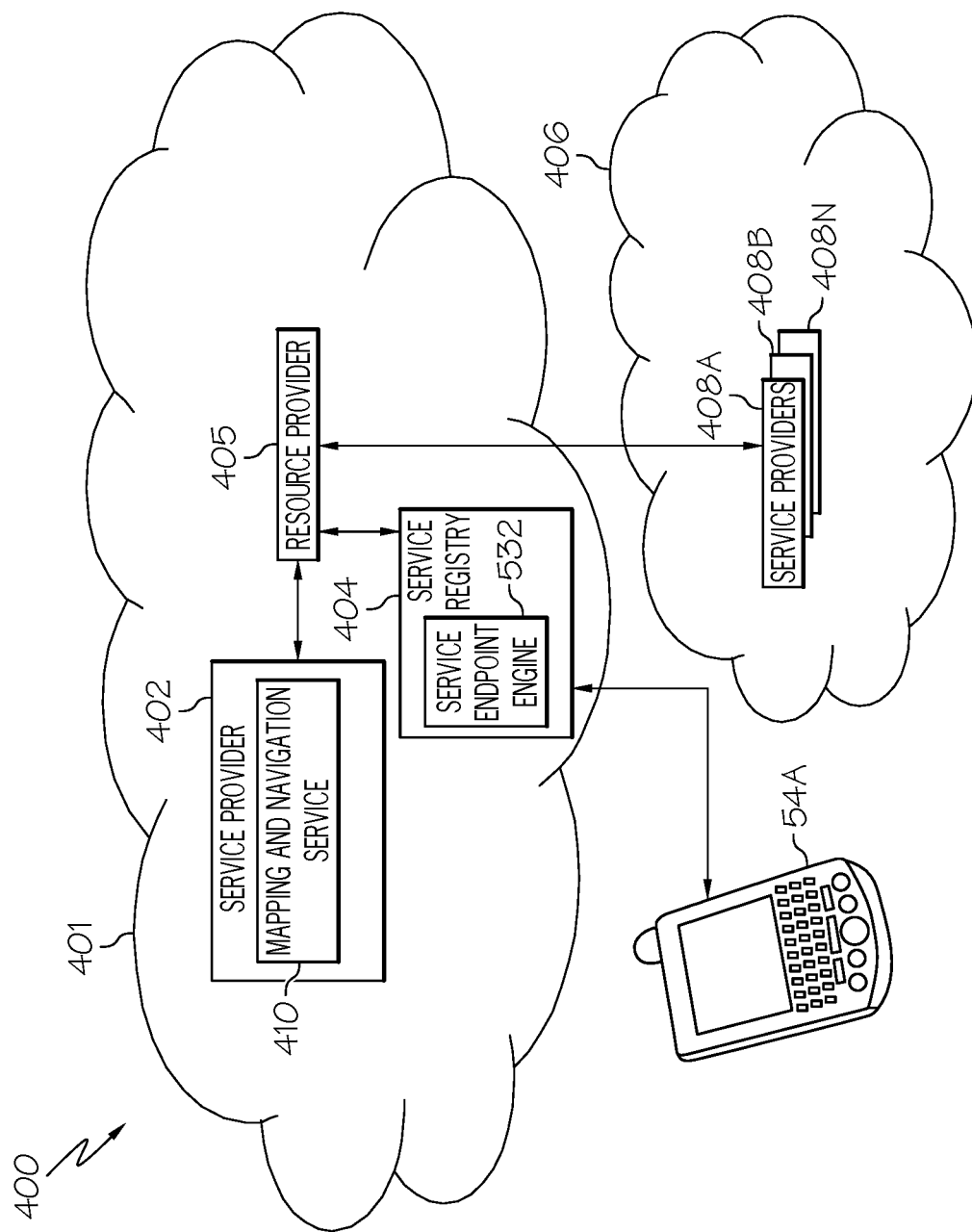
FIG. 4 illustrates a service oriented architecture system showing the interactions between a service registry; a service requester; service providers and a resource provider according to a resource provider embodiment of the present invention.

Referring to FIG. 4, there is shown an SOA system 400 providing full service management according to a service management embodiment of the present invention. The SOA system 400 comprises user device 54A and at least two networks 401 and 406. First network 401 comprises at least one service provider 402; registry 404 and resource provider 405; typically, first network 401 is an enterprise network. A second network 406 comprises service providers 408A-408N. Registry 404 includes service endpoint engine 532. Service provider 402 comprises an exemplary mapping and navigation service 410.

In this embodiment, full service management comprises a registry 404 interacting with resource provider 405 to provide a service, for example, a mapping service, without a client needing to engage with a service provider. A client requests the service from the service registry and then the resource provider provides the service from the service provider. Once a newly discovered service endpoint is registered, it is used by the resource provider 405 to interact with the service provider 402 or 408A-408N to control the service. The resource provider 405 acts as a proxy to communicate between the service provider 402 or 408A-408N and the service requester 54A. The resource provider 405 allows the full service management of the service including: charging for the service and management of service quality. In this embodiment, the service requester 54A does not communicate with the service provider 405 directly and the actual endpoint address of the service provider 402 or 408A-408N is not known to the service requester 54A.

Figure 5:
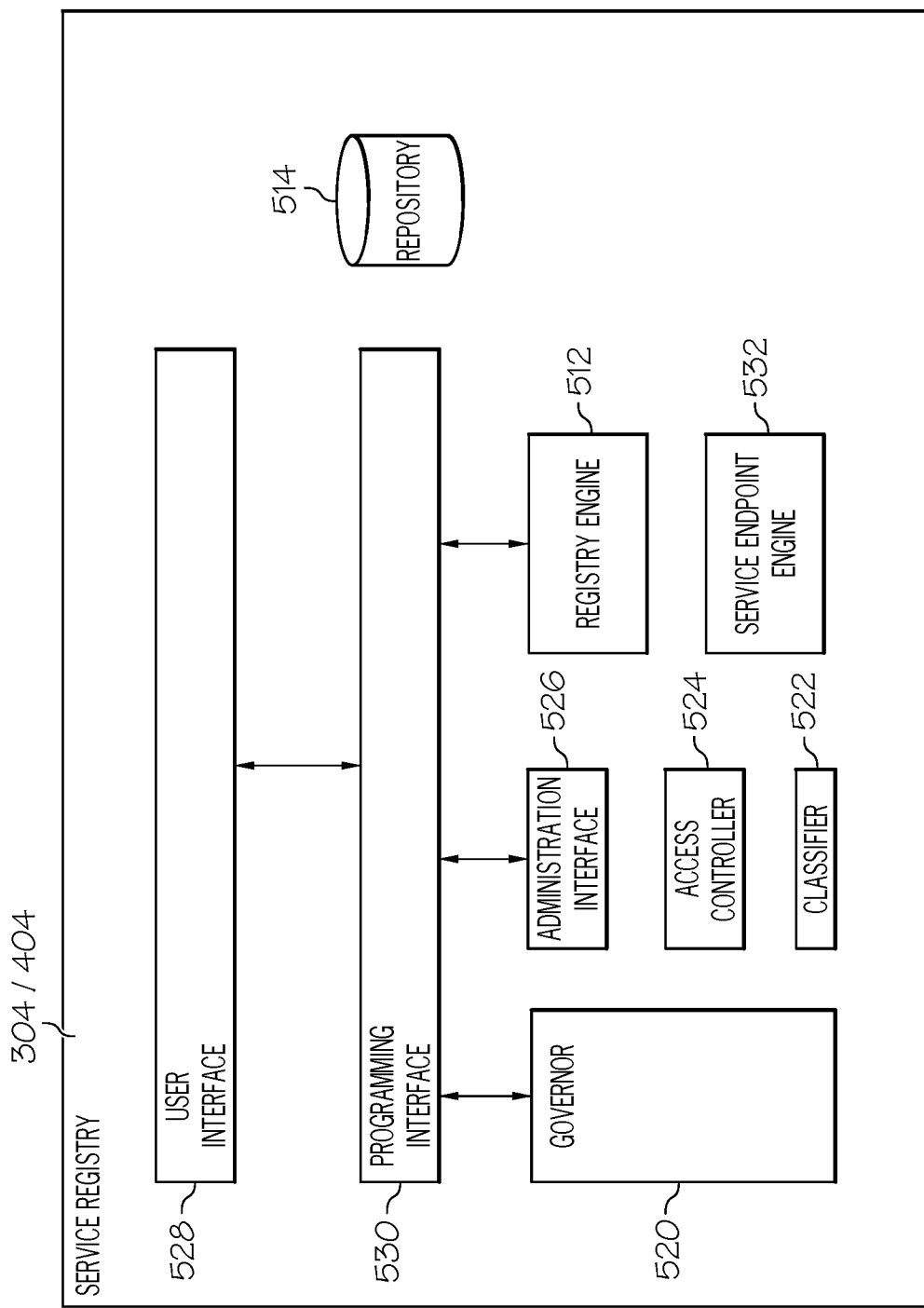
FIG. 5 illustrates a service registry according to an embodiment of the present invention.

Referring to FIG. 5, a component diagram of a service registry 304 (or 404) is described according to an embodiment of the present invention. A service registry 304 or 404 stores a plurality of service documents and allows access to the documents and the corresponding services. The service documents are indexed and the indices are stored in a service registry to allow location of a specific service with a particular characteristic. The service registry is an index of a subset of information about a service (for example, the location and name of service document) enabling the corresponding service document to be located and accessed in a repository 514 (or even the corresponding service located at the service provider). A tightly bonded service registry and repository allow a service operation to use both the indexed service information in the registry and the detailed service information in the repository. An example of an integrated service registry and repository is IBM® WebSphere® Registry and Repository (W SRR).

Such an integrated service registry and repository has advantages of greater business agility and resilience through reuse than separate systems. Further advantages of looser coupling, greater flexibility, better interoperability, and better governance arise from the integration. These advantages are addressed by separating service descriptions from their implementations, and using the service descriptions across the life cycle of the service. Standards-based service metadata artifacts, such as Web Service Definition Language (WSDL), extensible mark-up language (XML) schema, policy or Service Component Architecture (SCA) documents, capture the technical details of what a service can do, how it can be invoked, or what it expects other services to do. Semantic annotations and other metadata can be associated with these artifacts to offer insight to potential users of the service on how and when it can be used, and what purposes it serves.

In one embodiment, the service registry and repository for service documents is based on IBM® WebSphere® Service Registry and Repository. Such service documents include traditional Internet services that use a range of protocols and are implemented according to a variety of programming models. Although the embodiment discussed above is a standalone service registry, embodiments may comprise other SOA components that have an integrated service registry; for example, a service provider might have an integrated service registry to enable registry functions as well as service provider functions.

The service registry 304 (or 404) of one embodiment of the present invention is a Java® Platform, Enterprise Edition (Java® EE 6) application that runs on an IBM® WebSphere® Application Server 7 and uses an object database as a backing store to persist the service metadata. The service registry takes advantage of the role-based access control so that role-based views and access control can be turned on when the service registry and repository is deployed as an enterprise-wide application. Referring to FIG. 5, the service registry 304/404 comprises: registry engine 512; repository 514; governor 520; classifier 522; access controller 524; administration interface 526; user interface 528; programming interface 530; and service endpoint engine 532.

The registry engine 512 offers both registry function and repository function for service metadata. The repository function allows users to store (in repository 514), manage and query service metadata artifacts holding service descriptions. Registry engine 512 not only takes good care of the documents containing service metadata by reliable persistence of the data, but it also provides a fine-grained representation of the content of those documents, for example, ports and port types in some service documents. The registry engine 512 makes provision for decorating registered service declarations and elements of the derived content models with user-defined properties, relationships, and classifications. The registry provides a user interface 528 that makes use of those declarations when a search is performed to find entities, such as a service endpoint or service interface.

Documents stored in repository 514 are monitored by registry engine 512 for changes. Whenever a change to a service document is detected by registry engine 512, it invokes validation and notification functions. Both kinds of function are considered extension mechanisms that can be used to customize how the registry engine 512 reacts to changes. A validation function can be written such that the registry engine 512 will execute when changes are made to the content. For example, a validation function that checks for completeness of a service definition. The registry engine 512 includes a notification plug-in (not shown) with a subscription capability for a notification communicating a change in the content of the service registry and repository.

Through the governor 520, the registry engine 512 supports a rich set of extensible governance functions, including the ability to model a service life cycle for a governed entity, define valid transitions between service states, write and plug-in validators to guard the transitions between states, and designate actions (notification actions) to be taken as result of the transition. The governor 520 provides interfaces to analyze the impact of changes to content, and provides auditing of such changes.

Classifier 522 allows service descriptions and parts of service definitions to be annotated with corporate vocabulary and to capture the governance state. Service classification systems are captured in web ontology language (OWL) documents that are loaded into the service registry using the administrative interface 526. Service registry entities can be classified with values from these classification systems, to allow classification-based queries to be performed, and to allow access restrictions based on classification.

Access controller 524 supports a fine-grained access control model that allows for the definition of which user roles can perform specific types of actions on corresponding artifacts. Visibility of services can be restricted by business area and user roles can be restricted from transitioning services to certain life cycle states. This is in addition to the role-based access control provided by the service registry and repository.

Administration interface 526 supports the import and export of repository content for exchange with other repositories and provide an application programming interface (API) for configuration and basic administration. These support interactions with the access controller 524 and with the classifier 522.

User interface 528 enables user interaction with the service registry and repository and supports all user roles, offering lookup, browse, retrieve, publish, and annotation capabilities, as well as governance activities, such as import/export and impact analysis. The user interface 528 may be offered as a plug-in for various third party tools to support interoperability.

Programming interface 530 uses standard APIs to interact with registry engine 512 (for instance Java® and a standard SOA protocol). The programming interface 530 provides interfaces for basic operations such as create, retrieve, update and delete (CRUD), governance operations, and a flexible query capability. The programming interface 530 can communicate content using XML data structures or by using Service Data Objects (SDOs). Documents can be created, retrieved, updated and deleted using either the user interface 528 or the programming interface 530.

Service endpoint engine 532 comprises processing logic for handling requests for service endpoints. The processing logic deals with the request when there is no service endpoint or when the quality of the service requested does not match the quality of the service provided by a service endpoint. The process steps performed by the service endpoint engine 532 are described with reference to the embodiments of FIGS. 7, 8 and 9.

Figure 6:
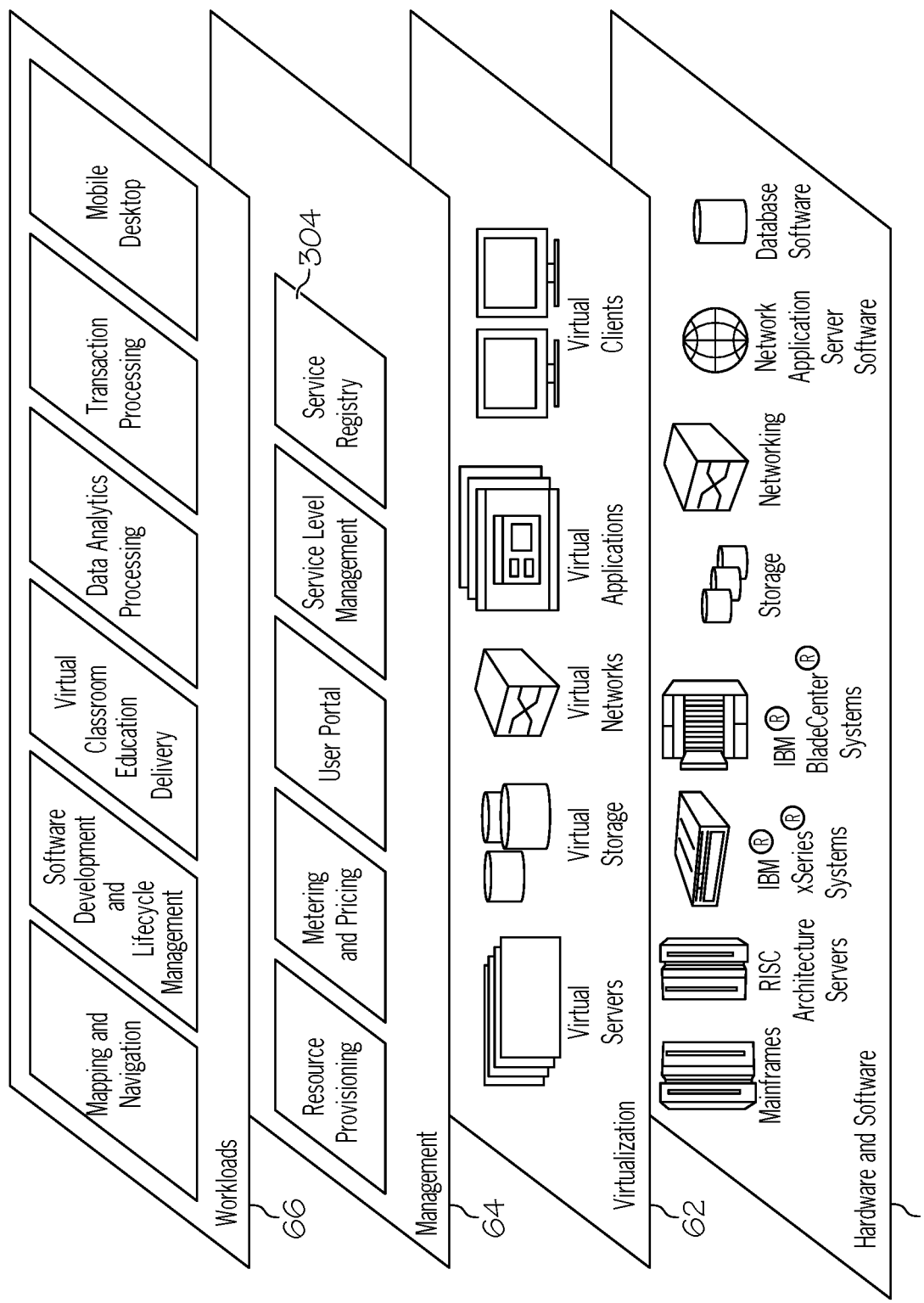
FIG. 6 illustrates virtualization abstraction model layers according to a cloud embodiment of the present invention.

Referring to FIG. 6, virtualization abstraction model layers provided by a cloud computing environment of an embodiment of the present invention are now described. The components, layers, and functions shown in FIG. 6 are intended to be illustrative and embodiments of the present invention are not limited thereto. As depicted, the following layers and corresponding functions are provided: hardware and software layer 60; virtualization layer 62; management layer 64; and workload layer 66.

Hardware and software layer 60 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® Web Sphere® application server software; and database software, in one example IBM® DB2® database software.

Virtualization layer 62 provides an abstraction layer from which the following examples of virtual entities may be provided: virtual servers; virtual storage; virtual networks, including virtual private networks; virtual applications and operating systems; and virtual clients.

In one embodiment, the service registry 304 (FIGS. 3 and 5) and the resource provisioning are part of management layer 64 of a cloud system. Management layer 64 further includes other functions such as metering and pricing; user portals and service level management. Resource provisioning provides dynamic procurement of computing resources and other resources that are utilized to perform tasks within the cloud computing environment. Service registry provides the directory for the computing and other resources used in the cloud system. Metering and pricing provide cost tracking as resources are utilized within the cloud computing environment, and billing or invoicing for consumption of these resources. In one example, these resources may comprise application software licenses. User portal provides access to the cloud computing environment for consumers and system administrators. Service level management provides cloud computing resource allocation and management such that required service levels are met.

Workloads layer 66 provides examples of functionality for which the cloud computing environment may be utilized. Examples of workloads and functions which may be provided from this layer include: mapping and navigation; software development and life cycle management; virtual classroom education delivery; data analytics processing; transaction processing; and mobile desktop. In a SOA system, the workloads in the workload layer are implemented as services.

Figure 7:
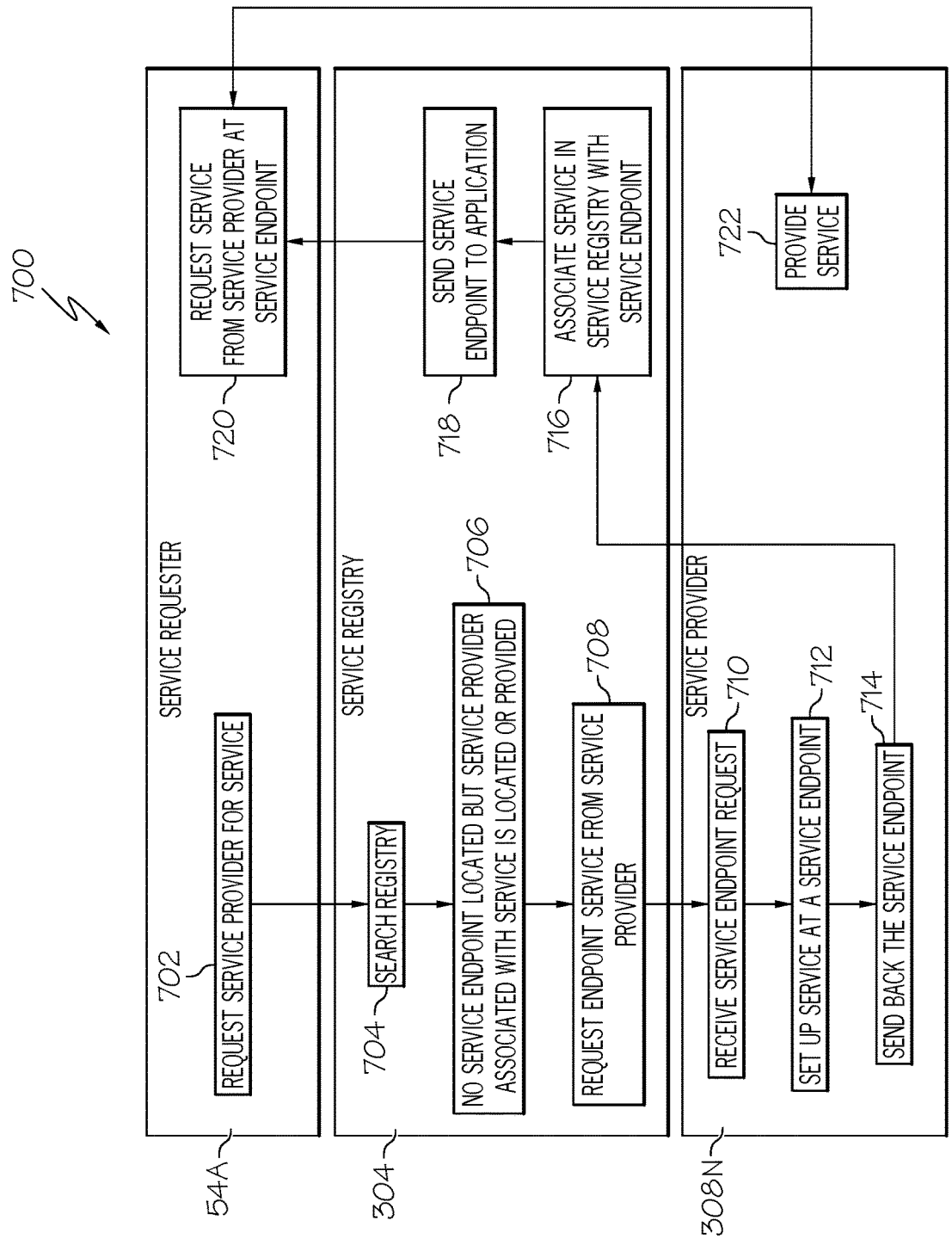
FIG. 7 is a process diagram of a method for provisioning a service within the service oriented environment in accordance with an embodiment of the present invention.

Referring to FIG. 7, there follows a description of a process 700 of an embodiment of the present invention performed by the processing logic of the service endpoint engine 532 (FIG. 5) and related components in the SOA system 300 (FIG. 3) or SOA system 400 (FIG. 4). This process can be adapted for at least the full service resource provisioning embodiment with suitable modifications. The process is described as process steps occurring with respect to the main components of the SOA system and in particular with respect to a service registry.

Referring to FIG. 7, in conjunction with FIGS. 3-6, service requester 54A requests, step 702, a service provider for a service and directs the request at the service registry 304. For instance, any one of the workload 66 services (see FIG. 6).

Service registry 304 searches, step 704, the repository 514 for a service endpoint associated with the service request, but in line with the problem addressed by this embodiment, the service registry does not find an associated service endpoint.

No exact service endpoint is located in the registry but service information associated with the requested service is used to locate, step 706, a service provider. If there is no associated service information, then a default service provider is located. For instance, a service provider name or generic management endpoint information may be stored in the repository and associated with the service request. In any case, a service provider is located or provided, step 706.

A service endpoint for the requested service is requested from the located or default service provider, step 708.

The located or default service provider 308N receives, step 710, the service request and sets up, step 712, the service. Once set up, the service provider associates the set up service with a service endpoint. The service might already be set up and have an existing service endpoint that the service registry was unaware of. The service might have been set up without a service endpoint and therefore the service provider only sets up and associates a service endpoint. If the service has not been set up, then service provider sets it up either at a known location or virtually at an unknown location. For virtual set up, resource provisioning in management layer 64 sets up a required virtualization layer configuration of servers, storage, networks, applications and clients and workload 66.

Whether the service endpoint was pre-existing or not, it is sent back, step 714, to the registry 304.

The registry then associates, step 716, the service registered in the service registry with the received service endpoint.

The registry then sends, step 718, the received service endpoint to the service requester 54A.

In this embodiment, in step 720, the service requester 54A requests the service from the service provider 308N at the received service endpoint.

The service provider 308N receives the service request at the service endpoint and commences to provide, step 722, the service back to the service requester 54A.

For instance, mobile phone service requester 54A requires a mapping service to log global positioning system (GPS) data as the service requester travels. A request 702 is made to the service registry for such a GPS data logging service but the registry does not find a specific service endpoint associated with the service. However, the registry does find a service name "GPS Mapping Service" and a service provider "Telemaps Logger" associated with the service. Service registry requests, step 708, a service endpoint from "Telemaps Logger." "Telemaps Logger" receives the service endpoint request and sets up, step 712, or discovers a "GPS Mapping Service" at a service endpoint, for example, IP address 192.168.2.3 and port 1200 (192.168.2.3:1200). The "Telemaps Logger" service provider then sends back, step 714, the service endpoint to the service registry. Service registry 304 associates, 192.168.2.3:1200 with "GPS Mapping service" and sends the same service endpoint back to the mobile phone. The mobile phone is then free to request, step 720, the service from "Telemaps Logger" using the received service endpoint. Telemaps Logger provides back the "GPS Mapping Service" when it is requested on service endpoint 192.168.2.3:1200. For example, the service sends map data showing the geographical location of the mobile phone, and the map data is rendered on the mobile phone screen by the mobile phone.

Figure 8:
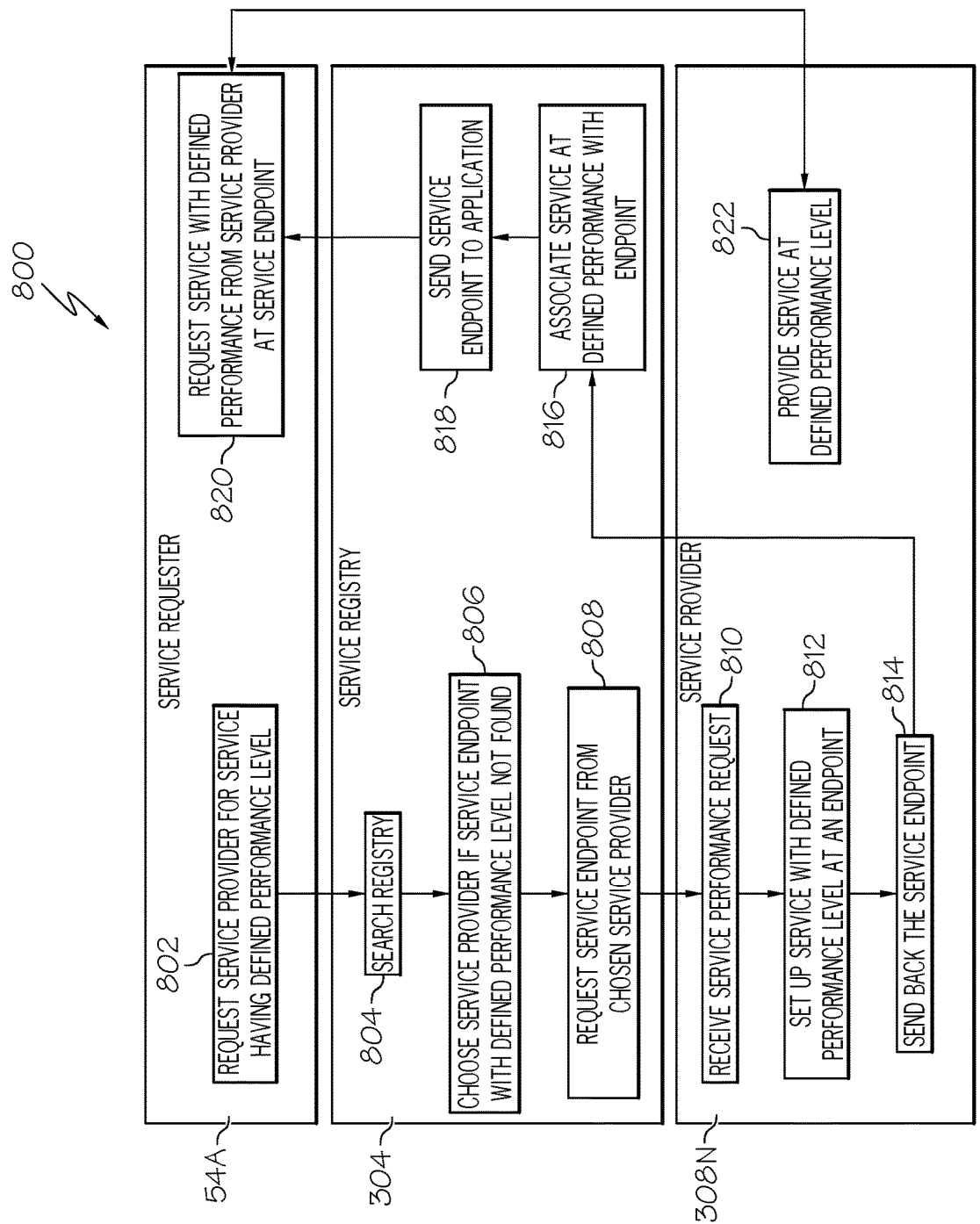
FIG. 8 is a process diagram of an alternative method for provisioning a service within the service oriented environment in accordance with an embodiment of the present invention.

Referring to FIG. 8, there follows a description of a performance method 800 of an embodiment of the present invention. As with method 700, method 800 can also be adapted for the full service resource provisioning embodiment with suitable modifications. The process is described as process steps occurring with respect to the main components of the SOA system and in particular to a service registry.

Referring to FIG. 8, in conjunction with FIGS. 3-6, service requester 54A requests, step 802, a service provider for a service having a defined performance level and directs the request at the service registry 304.

Service registry 304 searches, step 804, the repository 514 for a service endpoint having the defined performance level and associated with the service request, but in line with the problem addressed by this embodiment, the service registry does not find such an associated service endpoint.

If one or more service endpoints are located that provide the service but not at the required performance level, then these service providers are listed in a potential service provider list. If service providers without service endpoints and associated with the requested service are located, then these service providers are also listed in the potential service provider list. A first service provider is selected, step 806, from those in the potential service provider list; the selection is based on the closeness of the service performance to the required performance level. Optionally, those service providers having service endpoints get higher selection priority over those without. If there is no associated service information, then a default service provider is chosen.

A service endpoint for the requested service is requested, step 808, from the chosen service provider.

The selected or default service provider 308N receives, step 810, the service request, and if it can provide the required service performance, it sets up, step 812, a service endpoint for the service with the defined service performance. If the service provider cannot provide the service performance, then the request is declined and the service registry needs to select another service provider at step 806. If the service provider can provide the service, then the service might already be set up with a service endpoint but requires additional configuring to get the right performance level. The service might be already set up at the correct service performance level but without a service endpoint; the service provider only needs to set up an associated service endpoint and send it back, step 814. If the service is not already set up, then the service provider sets it up either at a known location or virtually at an unknown location. Whether the service endpoint was pre-existing or not, it is sent back, step 814, to the registry 304.

The registry then associates, step 816, the registered service have the defined performance level with the received service endpoint.

The registry then sends, step 818, the received service endpoint to the service requester 54A.

In this embodiment, the service requester 54A requests, step 820, the service from the service provider 308N at the received service endpoint. In this embodiment, the service endpoint will be associated with a defined performance level so there is no need to request the defined performance level in the second request. In other embodiments, it is conceivable that a service at a given service endpoint will have variable performance levels on request from the service requester.

The service provider receives the service request at the service endpoint and commences to provide, step 822, the service back to the service requester.

For instance, mobile phone service requester 54A requires a mapping service to log global positioning system (GPS) data as the service requester travels and requires 1 second or shorter updates. In this example, 1 second updates rules out our requester's default GPS service. A request 802 is made to the service registry for such a GPS data logging service but the registry does not find a specific service endpoint associated with the service. However, the registry does find a service named "Euro GPS Mapping Service" having a property that its precision is 0.8 sec updates and the registry understands that 0.8 sec is shorter than 1 second. Therefore, a service provider "Euro Map Logger" is associated with the service. Service registry requests, step 808, a service endpoint from "Euro Maps Logger." "Euro Maps Logger" receives the service endpoint request and sets up, step 812, or discovers a "Euro GPS Mapping Service" at a service endpoint, for example, IP address 214.168.2.3 and port 2400 (214.168.2.3:2400). The "Euro Maps Logger" service provider then sends back, step 814, the service endpoint to the service registry. Service registry 304 associates, 214.168.2.3:2400 with "Euro GPS Mapping Service" and sends the same service endpoint back to the mobile phone. The mobile phone is then free to request, step 820, the service from "Telemaps Logger" using the received service endpoint. Telemaps Logger provides back the "GPS Mapping Service" when it is requested on service endpoint 192.168.2.3:1200. For example, the service sends map data showing the geographical location of the mobile phone and the map data is rendered on the mobile phone screen by the mobile phone.

Figure 9:
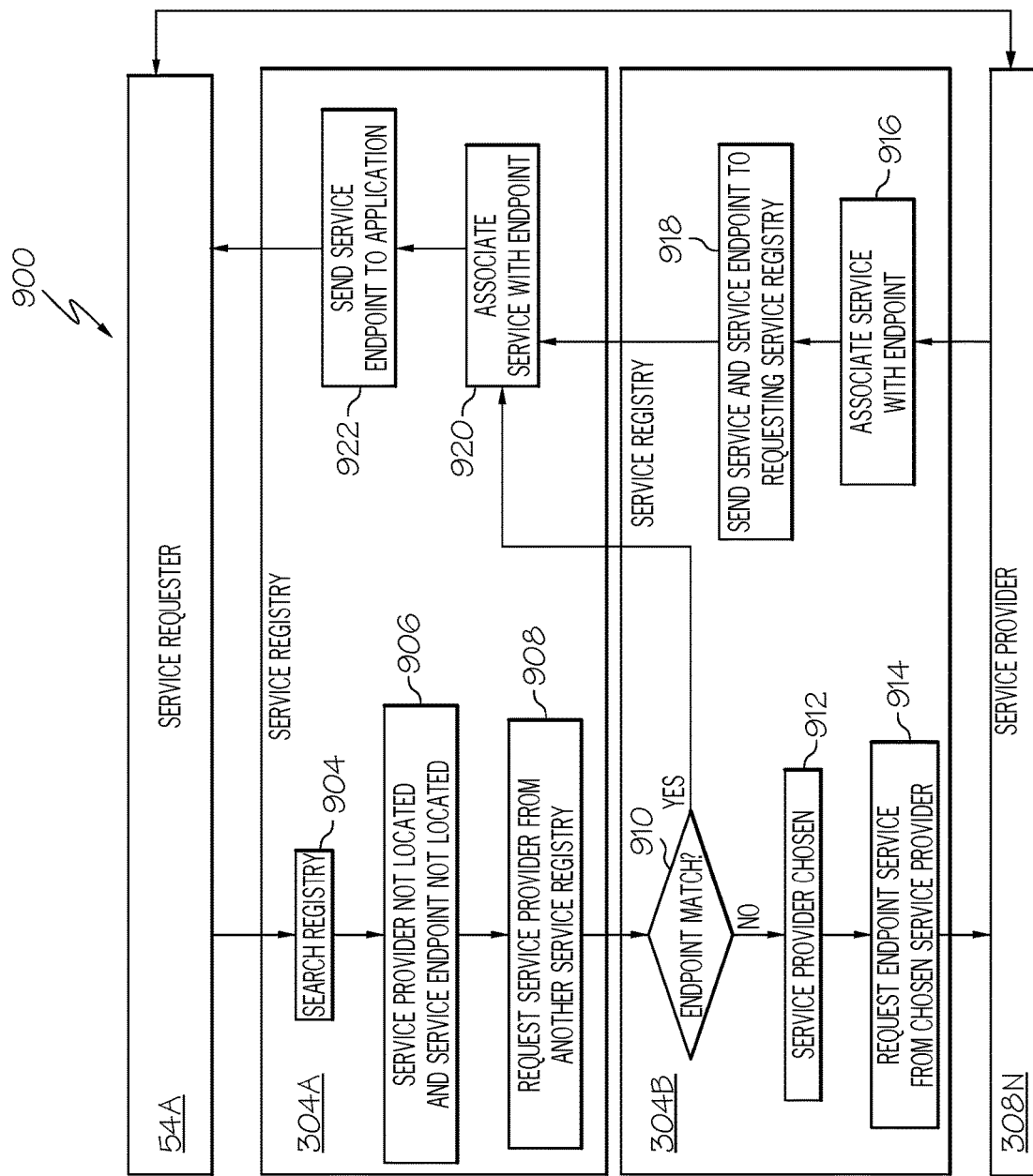
FIG. 9 is a process diagram of a further alternative method for provisioning a service within the service oriented environment in accordance with an embodiment of the present invention.

Referring to FIG. 9, there follows a description of a search method 900 of a service registry proxy in accordance with an embodiment of the present invention. As with method 700 and 800, method 900 can also be adapted for the full service resource provisioning embodiment with suitable modifications. The process is described as process steps occurring with respect to the main components of the SOA system and in particular to a service registry.

Referring to FIG. 9, in conjunction with FIGS. 3-6, service requester 54A requests a service provider for a service from first service registry 304A.

First service registry 304A searches, step 904, the repository 514 for a service endpoint associated with the service request, but in line with the problem addressed by this embodiment, first service registry 304A, in step 906, does not find an associated service endpoint.

If there is no associated service information, then a default service provider may be located in accordance with previous embodiments. In this embodiment, the service registry 304A decides whether to use default service providers or forward the request to subsequent service registries. The service registry uses a search algorithm that generates a relevance value for each of the located service providers, if the relevance is below a threshold, and there is a second or subsequent service registry to ask, then service registry 304A requests, step 908, a service provider from a second (or subsequent) service registry 304B. The service information located by the first service registry is also sent to the second (or subsequent) service registry so that the second (or subsequent) registry can use consolidated service information when choosing a service provider.

The second (or subsequent) service registry 304B searches, step 910, the registry for a service endpoint associated with the service request. An exact match may be found, in which case, a service endpoint is sent back to the first service registry 304A and the process continues at step 920. Where no exact match is made, then the second service registry chooses, step 912, a located service provider or a default service provider. The second service registry 304B could choose a subsequent service registry based on the relevance of the search but this is not shown.

A service endpoint for the requested service is requested, step 914, from the chosen service provider.

The chosen service provider 308N receives the service request and sets up the service. Once set up, the service provider associates the service with a service endpoint. The service endpoint is sent back to the second service registry 304B.

The second service registry 304B then associates, step 916, the registered service with the received service endpoint.

The second service registry 304B then sends, step 918, the received service endpoint to the first service registry 304A.

The first service registry 304A associates, step 920, the registered service with the received service endpoint.

The first service registry 304A sends, step 922, the received service endpoint to the service requester 54A.

The service requester 54A requests the service from the service provider 308N at the received service endpoint (not shown). The service provider receives the service request at the service endpoint and commences to provide the service back to the service requester (not shown).

In summary, there is described a method, system and computer program product for service based deployment within a system conforming to a service orientated architecture (SOA). The method, system and computer program product, are operable by a service registry in a service orientated architecture system for providing a service within the system and comprising the steps of: receiving a service request from a service requester in the system; checking the status of the service as registered in the service registry; characterized by; in response to the service not having a registered service endpoint or a property of the service falling below a defined threshold, sending a request to one or more service providers or subsequent service registries to provide a new service; and in response to a service provider providing the new service, updating the service registry with the new service and responding to the service requester that the service is available. The embodiments allow both direct interaction between the requester and provider or indirect interaction via a service management layer. The embodiments also allow the service provider to be provided as a virtual server and the service to be provided as a virtual application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for operating a service registry in a service oriented architecture system and managing a service within the system, the computer program product comprising a computer readable storage medium having program code embodied therewith, the program code comprising the programming instructions for:
   receiving a request for a service from a service requester in the environment;
   searching the service registry for a service endpoint associated with the service request;
   in response to not locating the service endpoint in the service registry but locating a service provider associated with the requested service, requesting the service endpoint from the located service provider, wherein the located service provider sets up service, wherein the located service provider associates the set up service with the service endpoint;
   associating the requested service with the service endpoint; and
   sending the service endpoint to the service requester, wherein the service requester requests the service from the located service provider at the received service endpoint, wherein the service is provided to the service requester by the located service provider in response to receiving from the service requester the service request at the service endpoint thereby allowing the service requester to receive a desired quality of service and not experience a delay or difference in quality of service;
   wherein the service request is a request for a service having a defined performance level, wherein the program code further comprises the programming instructions for:
      searching the service registry for a service endpoint having the defined performance level and associated with the service request;
      choosing a service provider in response to not locating a service endpoint having the defined performance level;
      requesting a service endpoint from the chosen service provider;
      receiving the requested service endpoint from the chosen service provider;

associating the requested service having the defined performance level with the service endpoint;

sending the service endpoint to the service requester, wherein the service requester requests the service from the service provider at the received service endpoint; and providing the service to the service quester in response to receiving from the service requester the service request at the service endpoint.

2. The computer program product as recited in claim 1, wherein the service request includes a required standard of service, wherein the program code further comprises the programming instructions for:

in response to the service being registered but not having the required standard, sending a request to one or more service providers to provide a service having the required standard; and in response to a service provider providing the service having the required standard, updating the service registry with the new service and standard of service.

3. The computer program product as recited in claim 2, where the standard of service is a service property meeting a required threshold.

4. The computer program product as recited in claim 3, wherein the service property is one or more of the following:
a rate of performing the service;
a cost of the service; and
a number of service instances provided.

5. The computer program product as recited in claim 1, wherein the program code further comprises the programming instructions for:

in response to the service requested not being registered, sending the service request to one or more subsequent service registries to provide a service provider for the service.

6. The computer program product as recited in claim 5, wherein the program code further comprises the programming instructions for:

sending located service information to the one or more subsequent service registries so that the one or more subsequent service registries can use previously located service information and subsequently locate service information to choose the service provider.

7. The computer program product as recited in claim 1, wherein the program code further comprises the programming instructions for:

mediating between the service requester and the service provider, wherein the service requester does not receive a service endpoint of the service provider but uses the service through a service management layer.

8. A system, comprising:
a memory unit for storing a computer program for operating a service registry in a service oriented architecture and managing a service within the service oriented architecture; and
a processor coupled to the memory unit, wherein the processor is configured to execute the program instructions of the computer program comprising:
receiving a request for a service from a service requester in the environment;
searching the service registry for a service endpoint associated with the service request;
in response to not locating the service endpoint in the service registry but locating a service provider associated with the requested service, requesting the service endpoint from the located service provider, wherein the located service provider sets up service, wherein the located service provider associates the set up service with the service endpoint;
associating the requested service with the service endpoint; and
sending the service endpoint to the service requester, wherein the service requester requests the service from the located service provider at the received service endpoint, wherein the service is provided to the service requester by the located service provider in response to receiving from the service requester the service request at the service endpoint thereby allowing the service requester to receive a desired quality of service and not experience a delay or difference in quality of service;
wherein the service request is a request for a service having a defined performance level, wherein the program code further comprises the programming instructions for:
searching the service registry for a service endpoint having the defined performance level and associated with the service request;
choosing a service provider in response to not locating a service endpoint having the defined performance level;
requesting a service endpoint from the chosen service provider;
receiving the requested service endpoint from the chosen service provider;
associating the requested service having the defined performance level with the service endpoint;
sending the service endpoint to the service requester, wherein the service requester requests the service from the service provider at the received service endpoint; and
providing the service to the service quester in response to receiving from the service requester the service request at the service endpoint.

9. The system as recited in claim 8, wherein the service request includes a required standard of service, wherein the program instructions of the computer program further comprise:

in response to the service being registered but not having the required standard, sending a request to one or more service providers to provide a service having the required standard; and in response to a service provider providing the service having the required standard, updating the service registry with the new service and standard of service.

10. The system as recited in claim 9, where the standard of service is a service property meeting a required threshold.

11. The system as recited in claim 10, wherein the service property is one or more of the following:
a rate of performing the service;
a cost of the service; and
a number of service instances provided.

12. The system as recited in claim 8, wherein the program instructions of the computer program further comprise:

in response to the service requested not being registered, sending the service request to one or more subsequent service registries to provide a service provider for the service.

13. The system as recited in claim 12, wherein the program instructions of the computer program further comprise:

sending located service information to the one or more subsequent service registries so that the one or more subsequent service registries can use previously located service information and subsequently locate service information to choose the service provider.

14. The system as recited in claim 8, wherein the program instructions of the computer program further comprise:
    mediating between the service requester and the service provider, wherein the service requester does not receive a service endpoint of the service provider but uses the service through a service management layer.

15. The computer program product as recited in claim 1, wherein the program code further comprises the programming instructions for:
    monitoring usage of service for deployed service instances; and
    removing a virtual machine image of a service whose usage drops below a threshold level.

16. The system as recited in claim 8, wherein the program instructions of the computer program further comprise:
    monitoring usage of service for deployed service instances; and
    removing a virtual machine image of a service whose usage drops below a threshold level.

17. The computer program product as recited in claim 1, wherein the program code further comprises the programming instructions for:
    requesting a service provider from another service registry in response to not locating a service provider with a relevance value that meets or exceeds a threshold value and not locating a service endpoint associated with the service request.

18. The system as recited in claim 8, wherein the program instructions of the computer program further comprise:
    requesting a service provider from another service registry in response to not locating a service provider with a relevance value that meets or exceeds a threshold value and not locating a service endpoint associated with the service request.

* * * * *